Jan. 29, 1924.
B. C. ZUHARS
1,482,179
MOTOR VEHICLE
Filed July 22, 1921    2 Sheets-Sheet 1
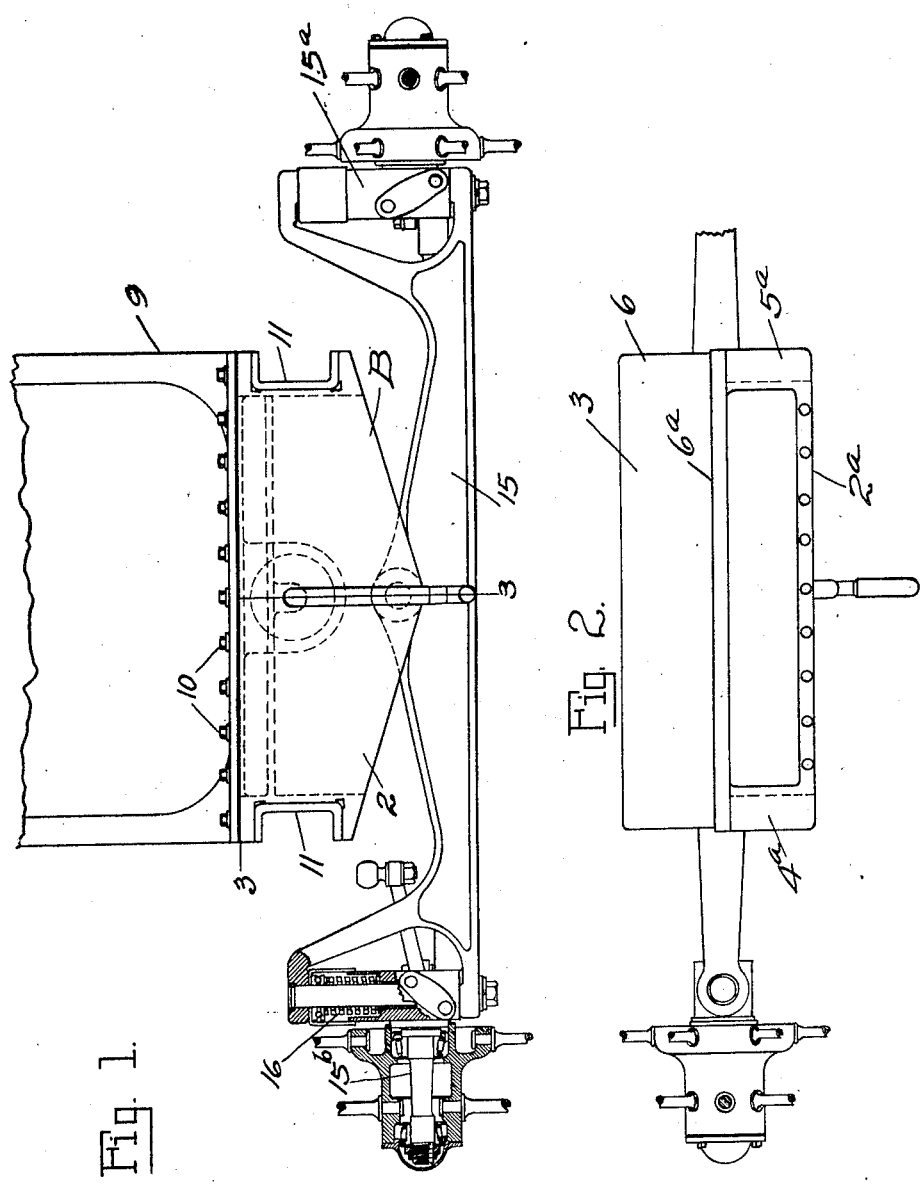
Benjamin C. Zuhars Inventor
By Staley & Borman Attorneys Jan. 29, 1924. 1,482,179

B. C. ZUHARS

MOTOR VEHICLE

Filed July 22, 1921  2 Sheets-Sheet 2

Inventor
Benjamin C. Zuhars

By Staley S. Bowman
Attorneys

Patented Jan. 29, 1924.

1,482,179

UNITED STATES PATENT OFFICE.

BENJAMIN C. ZUHARS, OF COLUMBUS, OHIO, ASSIGNOR TO THE OHIO TRACTOR COMPANY, OF COLUMBUS, OHIO, A CORPORATION OF OHIO.

MOTOR VEHICLE.

Application filed July 22, 1921. Serial No. 486,873.

*To all whom it may concern:*

Be it known that I, BENJAMIN C. ZUHARS, a citizen of the United States, residing at Columbus, in the county of Franklin and State of Ohio, have invented certain new and useful Improvements in Motor Vehicles, of which the following is a specification.

This invention relates to improvements in motor vehicles, particularly tractors, and it more especially relates to a front construction for supporting the frame, power unit and radiator.

An object of the invention is to so construct the forward support for the frame and power unit that it will not only support the radiator but also embody therein as an integral part thereof, the lower water chamber for the radiator; a more specific object being to provide a front bolster arranged to pivotally connect the forward end of the main frame to the front axle and swively support the power unit, which bolster is of an integral construction and has cast therein a water chamber so arranged that when the radiator is secured thereto the water chamber will communicate with the lower ends of the tubes of the radiator and form the lower water chamber thereof.

A further object of the invention is to simplify and cheapen the construction and make more effective the operation thereof.

In the accompanying drawings:—

Fig. 1 is a front elevation partly in section of so much of a motor vehicle as is necessary to illustrate the improvements.

Fig. 2 is a top plan view of the supporting bolster and axle with the radiator removed.

Figure 3:
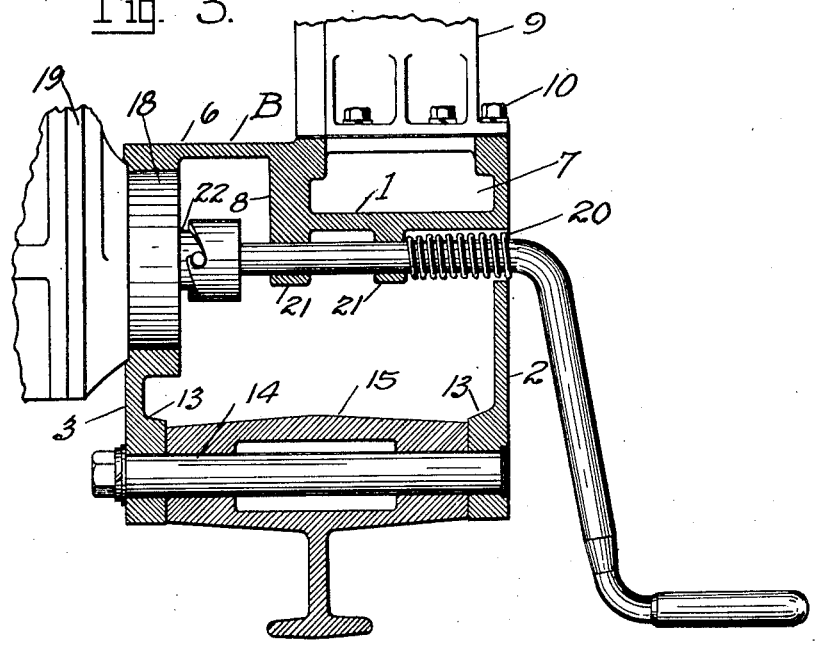
Fig. 3 is an enlarged sectional view, the section being on the line 3—3 of Fig 1.
Figure 4:
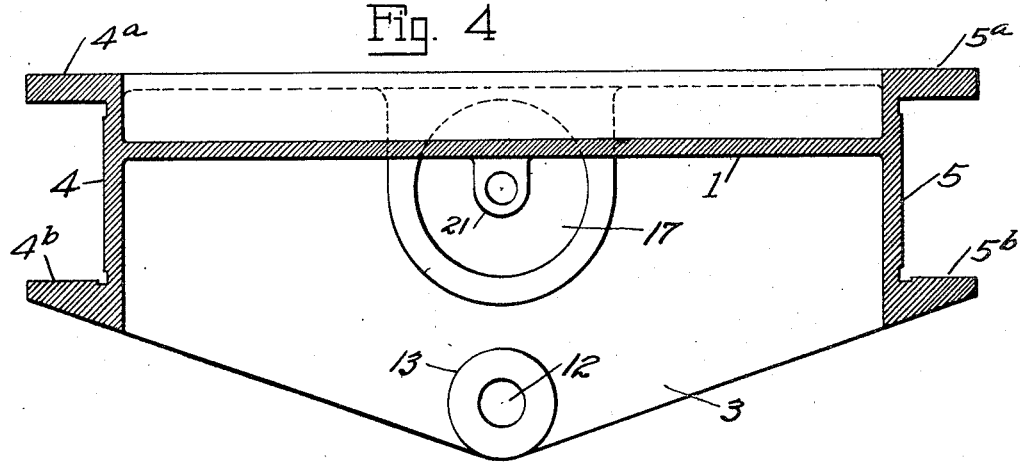
Fig. 4 is a longitudinal section of the bolster.

Referring to the drawings, B represents in a general way, a bolster which is formed of a single integral casting in which 1 represents a horizontal interior wall, 2 and 3 front and rear side walls, 4 and 5 end walls and 6 a top wall. The wall 6 encloses the top of the rear half of the bolster structure, the forward half thereof being open so as to form an open top chamber 7 which is enclosed by the two end walls, the front wall, the horizontal wall 1 and a depending wall 8 which projects downwardly from the forward edge of the top wall 6. The upper edge of the forward wall 2 and top wall 6 have finished faces $2^a$ and $6^a$ while the top edges of the end walls 4 and 5 have laterally projecting flanges $4^a$ and $5^a$, the upper surfaces of which are also finished, these finished faces forming a seat for the radiator 9 and to which it is secured by the bolts 10; the radiator in this case being minus the usual lower water chamber. By this arrangement it will be seen that the lower part of the radiator tubes are brought in communication with the chamber 7 which will thus form the lower chamber for the radiator and act to receive the cooling water from the entire series of tubes; this chamber being of a size substantially the same as the width and length of the open lower end of the radiator. Any suitable connection from this chamber 7 may be made to the water jacket of the engine, such connection being not shown in the present case.

The side frame members 11 of the vehicle are connected to the respective ends of the bolster between the flanges $4^a$ and $5^a$ and co-operating flanges $4^b$ and $5^b$ projecting laterally from the lower edges of the end walls.

The front and rear walls 2 and 3 preferably have their lower edges inclined downwardly so that the greatest height of these walls will be at a point midway their ends, at which points near the lower edge thereof, they are provided with aligned openings 12 surrounded at their inner ends by circular bosses 13, these openings being designed to receive a pin 14 which projects through a journal opening in the front axle 15 so as to pivotally connect the bolster and axle at points both midway the length thereof and which forms one of the supports of a three point suspension for the frame of the machine, the rear end of the frame being supported at each side in any usual and well known way. The axle may be of the usual construction in which the ends are bifurcated to receive the knuckles $15^a$ of the wheel spindles $15^b$; springs 16 being preferably interposed between the axle and the knuckles to absorb shocks.

The rear side wall 3 of the bolster has an opening 17 in which is journaled a trunnion 18 formed on the forward end of the power unit, a portion 19 of the casing which is shown in Fig. 3, the power unit being in the present case an internal combustion engine. The opening 17 is disposed midway the length of the bolster above the opening 12 so that the axis of the trunnion 18 will be disposed in vertical alignment with the axis of the pin 14. The forward side wall 2 has an opening 20 and projecting downwardly from the wall 1 are integral lugs 21 which have openings aligned with the opening 20; these openings being designed to receive a starting crank 21 to engage the crank shaft 22 of the engine.

By this construction it will be seen that I have provided not only a simple, compact and economical arrangement for pivotally supporting the forward end of the main frame and swivelly supporting the forward end of the power unit but also for supporting the radiator and providing a lower water chamber therefor which is separated from the radiator proper, which results in a simple, economical and substantial construction.

Having thus described my invention, I claim:—

1. In a structure of the character described, a bolster constructed with front, rear and side walls and also with integral interior walls to provide an open-top water chamber in the upper part of said bolster extending substantially throughout the length thereof, a radiator supported on said bolster with its lower end communicating with said chamber, an axle straddled by the front and rear walls of said bolster together with a pivotal connection between the same, and a power unit having a part on its forward end journaled in the rear wall of said bolster.

2. In a structure of the character described, a bolster formed with integral front, rear, side and top walls and also with integral interior walls in its upper portion to provide a water chamber open at the top, a radiator supported on said bolster with its lower end communicating with said water chamber, frame members connected with said bolster, an axle straddled by the front and rear walls of said bolster and pivotally connected therewith, a power unit having a part at its forward end journaled in the rear wall of said bolster, and integrally formed depending perforated lugs on said bolster to form a support for a starting crank.

In testimony whereof, I have hereunto set my hand this 7th day of July, 1921.

BENJAMIN C. ZUHARS.